United States Patent [19]

Schaal et al.

[11] Patent Number: 5,466,188

[45] Date of Patent: Nov. 14, 1995

[54] METHOD OF DECORTICATING FLAX AND A FLAX DRESSING MACHINE FOR CARRYING OUT THIS METHOD

[75] Inventors: Walter Schaal, Harsewinkel; Horst Weigelt, Guetersloh, both of Germany

[73] Assignee: Claas OHG, Harsewinkel, Germany

[21] Appl. No.: 162,171

[22] PCT Filed: Jun. 12, 1992

[86] PCT No.: PCT/DE92/00488

§ 371 Date: Dec. 14, 1993

§ 102(e) Date: Dec. 14, 1993

[87] PCT Pub. No.: WO92/22690

PCT Pub. Date: Dec. 23, 1992

[30] Foreign Application Priority Data

Jun. 15, 1991 [DE] Germany .............. 41 19 749.6

[51] Int. Cl.[6] .............. A01F 11/02; A01F 12/42
[52] U.S. Cl. .............. 460/24; 460/68
[58] Field of Search .............. 460/24, 67, 68, 460/69

[56] References Cited

U.S. PATENT DOCUMENTS

| | | | |
|---|---|---|---|
| 3,481,342 | 12/1969 | Rowland-Hill et al. | 460/68 |
| 3,982,548 | 9/1976 | Stamp et al. | |
| 4,198,802 | 4/1980 | Hengen et al. | 460/67 X |
| 4,492,237 | 1/1985 | Pakosh. | |

FOREIGN PATENT DOCUMENTS

| | | |
|---|---|---|
| 893541 | 6/1982 | Belgium. |
| 0230276A1 | 7/1987 | European Pat. Off.. |
| 0332726A1 | 9/1989 | European Pat. Off.. |
| 0398421A1 | 11/1990 | European Pat. Off.. |
| 2714760 | 10/1977 | Germany. |
| 3320717 | 12/1984 | Germany. |
| 3639022C1 | 4/1988 | Germany. |
| 3735235A1 | 4/1989 | Germany. |
| 3815771 | 11/1989 | Germany. |
| 2151893 | 7/1985 | United Kingdom. |

*Primary Examiner*—Terry Lee Melius
*Attorney, Agent, or Firm*—Spencer, Frank & Schneider

[57] ABSTRACT

A flax dressing machine for decorticating a tangled mass of flax includes a first breaking edge. A first breaker is provided, and includes stationary plate-shaped elements arranged to form parallel gaps, and rotatable plate-shaped elements rotatable about a first axis arranged transverse to a direction of flow of the flax and forming parallel and radially arranged gaps. Each of the gaps extends essentially in the direction of flow of the flax. A second breaker comprises a drum rotatable about a second axis parallel to the first axis and is arranged transverse to the direction of flow of the flax. The drum has beating tools attached to an outer circumference thereof. A peripherally arranged bottom region forms with the outer circumference a peripheral gapped region for accommodating flax. The bottom region has stationary rubbing tools attached thereto that cooperate with the beating tools. One of the first and second breakers is located adjacent to the first breaking edge. A second breaking edge is located between the first breaker and the second breaker. A fine-breaking and fiber-cleaning device has an elongated rotor rotatable about at least one third axis that is essentially transverse to the first and second axis and that extends in the direction of flow of the flax. The device includes means for conveying, loosening, separating, and cleaning the flax. The fine-breaking and fiber-cleaning device is located subsequent to the first and second breakers relative to the direction of flow of the flax.

51 Claims, 6 Drawing Sheets

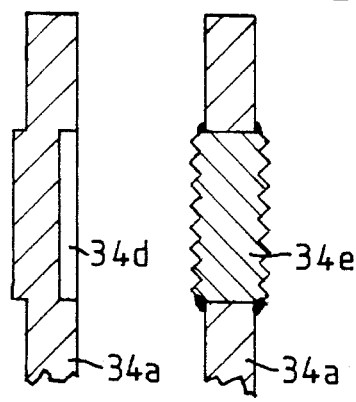
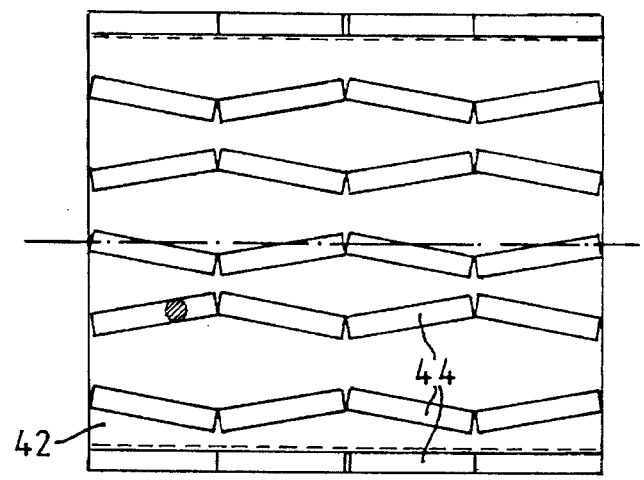
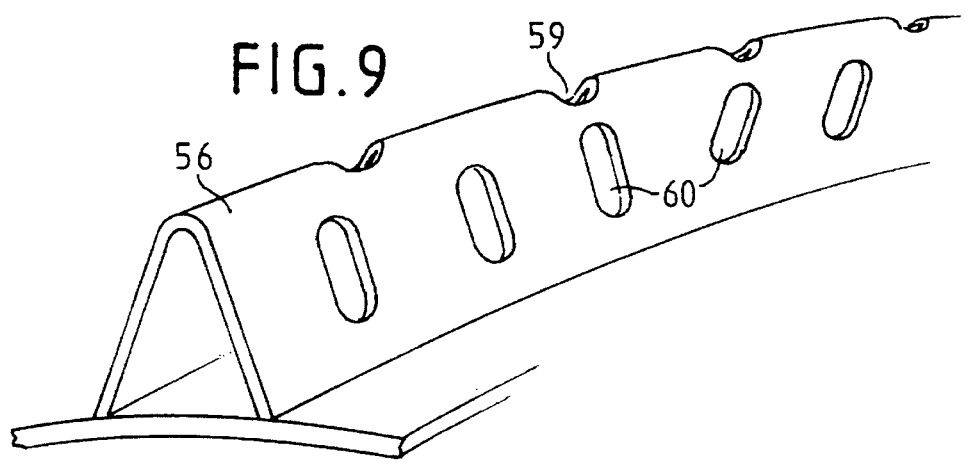
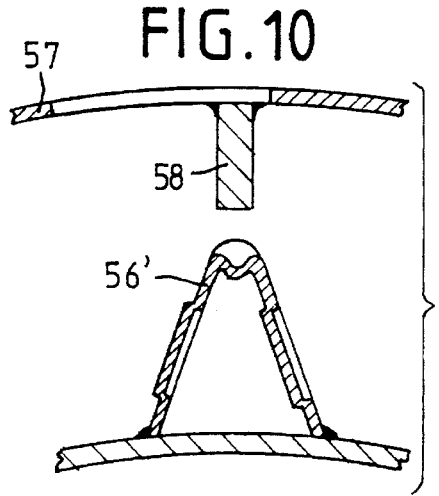
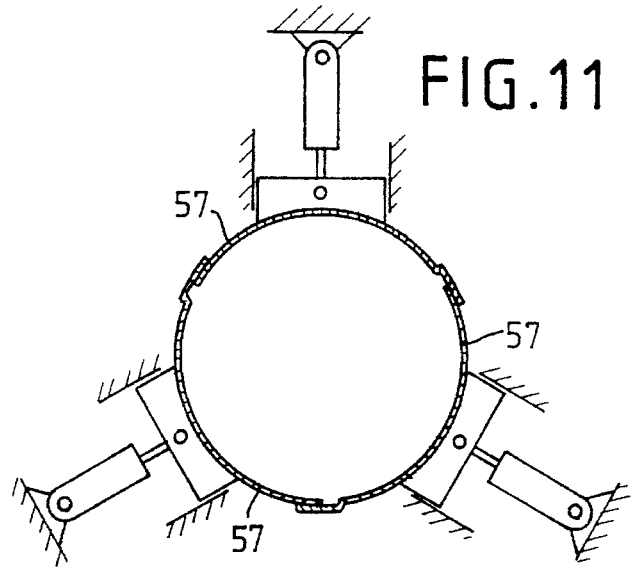

5,466,188

METHOD OF DECORTICATING FLAX AND A FLAX DRESSING MACHINE FOR CARRYING OUT THIS METHOD

BACKGROUND OF THE INVENTION

The invention relates to a method and a corresponding flax dressing machine having a breaking device for decorticating flax.

The harvesting process of the traditional flax line for the textile sector is directed towards obtaining a maximum fiber length in conjunction with uniform fiber length distribution and fibers arranged parallel. For these quality requirements the conduct of the dew retting of the pulled plants in the field and recognition of the correct gathering time are of decisive importance. The risk of losing the harvest is great and the period of time during which harvesting is possible, the so-called harvesting window, is extremely short and cannot be determined in advance because of the dependence of the biological dew retting process on weather.

Parallel laying of the pulled flax stalks in the field and the maintenance of this strict orientation during all subsequent intermediate mechanical steps in the field constitute another major feature of the traditional harvesting technique. This parallel orientation adds considerably to the difficulty of handling the material in the field. It was, however, hitherto unavoidable, not only in connection with the further dressing of the flax but also because of its influence on the retting process in the field. Good arrangement on the ground and a slight layer thickness ensured uniform retting.

According to the traditional line the fibers themselves are obtained by a process carried out in stationary equipment only after the stalk material has been gathered. Since the fibers amount to at most 20% of the weight of the stalks, 80% of the biomass was therefore transported unnecessarily.

From EP-A-0 332 726 a self-propelled flax harvesting device is known which already contains a breaking device in the form of numerous pairs of breaking rollers. It is thereby attempted to decorticate the flax straw already in the field, at least coarsely, and to strew the wood components over the field. However, here also the flax straw must be fed to the breaking device with an appropriate parallel alignment. If in this known machine a pick-up head is provided to pick up flax straw in tangled form, this means that the tangled, bent stalks must be realigned exactly parallel in the machine.

DE-A-37 35 235 also describes a flax harvesting machine having a breaking device for the woody inner core of the flax stems. Here also the stems are fed to the breaking device in an orderly, uniform manner.

SUMMARY OF THE INVENTION

The problem underlying the invention is that of proposing a flax decortication method which is so effective that after brief dew retting or slight chemical pretreatment a degree of decortication can be achieved which can form the preliminary stage of a modern fiber disintegration process for stationary operation. In addition, the aim is to propose for the application of this method a machine which is so compact that it can also be mounted on a vehicle and can work during travel.

These problems are solved by the performing the following steps: feeding the tangled mass of flax into a flax dressing machine; pulling the flax over a first breaking edge; moving the flax, after the pulling step, through a plurality of parallel slots using a plurality of gripping elements; pulling the flax, after the moving step, over a second breaking edge; conveying the flax from the second breaking edge through a peripheral gap formed in a drum breaking device in a direction tangential to the device to form an essentially decorticated fiber; and moving the fiber, after the conveying step, in an axial direction through a fine breaking and fiber cleaning device having an elongated rotor and being comprised means for conveying, loosening, separating, and cleaning the flax.

The foregoing method is performed using a flax dressing machine, comprising: a first breaking edge located adjacent to an entrance into an interior of the flax dressing machine; a first breaker comprising a plurality of stationary plate-shaped elements arranged to form a plurality of parallel gaps, and a plurality of rotatable plate-shaped elements forming a plurality of parallel and radially arranged gaps and being rotatable about a first axis arranged transverse to a direction of flow of the flax, each of the gaps formed by said stationary and said rotatable plate-shaped elements extending essentially in a direction of flow of the flax; a second breaker comprising a drum rotatable about a second axis parallel to the first axis and arranged transverse to the direction of flow of the flax, the drum having a plurality of beating tools attached to an outer circumference thereof, and a peripherally arranged bottom region forming with the outer circumference a peripheral gapped region for accommodating the flax, the bottom region having a plurality of stationary rubbing tools attached thereto and cooperating with the beating tools attached to the drum, wherein one of the first and second breakers is located adjacent to the first breaking edge; a second breaking edge located between and adjacent to the first breaker and the second breaker; and a fine-breaking and fiber-cleaning device having an elongated rotor rotatable about at least one third axis essentially transverse to the first and second axis and extending in the direction of flow of the flax, and being comprised means for conveying, loosening, separating, and cleaning the flax, the fine-breaking and fiber-cleaning device being located subsequent to the first and second breakers relative to the direction of flow of the flax.

The harvesting process is thereby simplified, because the breaking device is no longer fed with stalks in a parallel arrangement but with a tangled mass. Field work before the decortication, for example mowing, pulling, turning, windrowing or threshing, can be carried out with the customary agricultural machines, so that the effective yield per unit area is considerably increased. The improvement of the decortication and above all its transfer to the field phase reduce the remaining transport and storage volume for the fibrous raw material. The problem of the considerable formation of dust in the first stage of the stationary further processing is also considerably reduced through the improved decortication.

The basic principle of the method proposed consists in that the flax stalks are pulled and broken not only always in the same direction by similarly arranged pairs of rollers, but in all directions, as corresponds to the continuous processing in a tangled mass. The stalks pass one after the other, in any sequence, through parallel gaps in a plate comb and the peripheral gap of a drum-type breaking device. This is followed by an axially operating fine breaking and fiber cleaning device. The woody components, so-called shives, are crumbled by continuous rubbing, bending and scraping and are detached from the fiber bundles. Sieves separate the shives and clean the fibers, and this action is assisted in the final stage of the processing by loosening. The process can be carried out in stationary equipment, but preference is given to a towed or self-propelled machine by which the woody components are scattered over the field. If, exceptionally, the flax is not picked up from a tangled mass on the field, where it has undergone at least a short retting phase, it can also be pulled or mown by appropriate pick-up devices and then immediately decorticated if suitable pretreatment of the crop has been carried out. The decorticated fibers are preferably compressed into large bales and transported in that form to the storage depots of the further processing plants.

The heart of the proposed flax dressing machine comprises two rotary breakers which work with tangential flow and whose parallel axes are disposed one behind the other, and a fine breaking and fiber cleaning device working with axial flow.

One of the breakers has a rotor composed of axially spaced star wheels and a plate comb consisting of correspondingly spaced plates. The plate comb is disposed under the rotor and through it pass cage rods which preferably have a structured surface after the style of concrete reinforcement bars. With their close spacing the cage rods form an arched sieve bottom which is situated at only a short radial distance from the outer edges of the star wheel prongs passing through the gaps between the plates. The top edges of the plates are preferably indented in a flat curve, this curved shape cooperating with the shape of the leading edges of the prongs. These edges expediently have a receding shape, for example at 15 degrees relative to a radius crossing the edge.

When the flax stalks are thus pulled through the gaps by the prongs, they should rub against the side edges of the latter, for which purpose the star wheels and the plates have edged openings, indentations and bulges or other structured surface regions. In order to ensure that the constant speed of rotation and a regular arrangement of the structured surface parts does not lead to the alignment of the material, which could then pass unhindered through the free spaces, it is proposed that on the one hand the mutual angular positions of the star wheels and on the other hand the structured parts should be distributed at random over the available surfaces.

The other breaker consists according to the proposal of a drum having a closed cylindrical peripheral wall on which beater bars are fitted with an axially parallel orientation. This beater drum cooperates with an arched sieve bottom, which has rubbing bars likewise arranged with an axially parallel orientation. These beater and rubbing bars may also have a structured surface. In order to be able to process different amounts without clogging, it is proposed that the sieve bottom of the drum breaker should be arranged resiliently and adjustably in respect of its radial distance from the drum. At the top both breakers should be covered by barrel-shaped casings, which together with the sieve bottoms form the inlets and outlets respectively.

After passing from the first breaker to the second, the flax stalks are forced to bend around an axis at right angles to the preceding bending or folding axis. The rubbing and scraping action also takes place correspondingly in the drum gap at another point on the periphery of the stalk. This is the decisive reason for which the stalks can be fed in a disorientated manner while effective decortication is nevertheless achieved, since it takes place on all sides.

A substantial improvement may in addition consist in that an exchangeable polygonal breaking bar, which constitutes an axially parallel inlet threshold, is disposed upstream of each of the breakers. If the breakers are disposed One immediately after the other, the second breaking bar is situated at the point of transition from one of them to the other. The stalks are then pulled over this bar by the rotor of the second breaker. However, the first breaking bar is still more effective, and it is proposed to provide an insertion and retention device directly upstream of it. This device may consist of at least two rollers equipped with drivers and having different peripheral speeds.

For the further improvement of intake conditions it is proposed to dispose upstream of the insertion and retention device a conveyor device having means for stretching the tangled mass picked up. The latter is not thereby given a parallel arrangement, but coarse wood particles are already broken off and preparation is made for pulling it over the breaking edge. The conveyor device may consist of chain conveyors arranged in a conveyor channel and capable of being driven at different speeds, which increase in the conveying direction. The bottom of the conveying channel is preferably grooved, corrugated or otherwise suitably structured and provided with openings in order that earth residues and coarse wood particles can already be separated there.

The fine breaking and fiber cleaning device follows with its axis at right angles to the breakers. Both in respect of its rotor and in respect of its peripheral wall it is preferably divided into four sections of different lengths. The first is an intake section. The rotor is here conical, with its diameter increasing in the direction of flow. In particular it carries blades arranged in axial planes and having axially parallel outer edges and is surrounded by a sieve ring on the inner surface of which guide bars are arranged in a spiral.

There then follows a fine breaking section having a cylindrical rotor shape adjoining the preceding cone. The rotor carries structured bars disposed in a spiral and intended to apply a particularly intensive rubbing and scraping action to the stalk material, which has already been partially decorticated at this point. The structured bars may be A-shaped sheet-metal sections, while openings, impressions and embossing or the like may be provided on the flanks and on the crest. It is essential that these profilings, too, have a random distribution, in respect of type and position, on the structured bars.

The rotor is expediently surrounded by a sieve lining, that is to say a plurality of sieve segments which are divided in the peripheral direction and which are expandably held and guided. With the aid of appropriate mechanical elements these segments are subjected to a force which pushes them radially inwards and which is controllable in dependence on the braking moment of the respective rotor section. The braking action of the charge on the rotor is at this point particularly great and sensitively dependent on the quantity picked up. By appropriate slackening of the force exerted on the segments it is thus possible to achieve a uniform driving torque and identical processing conditions.

A loosening section then follows. Here, after a jump in diameter, the rotor is continued with a substantially smaller diameter and a cylindrical shape. The rotor carries spirally arranged radial thrower prongs, which swirl and loosen the fibers so that the wood components can fall out. The rotor is closed at the bottom by a coaxial cylindrical bottom sieve, which consists of a diagonal wire fabric. On its inner side swirling bars in the form of partial spirals are disposed. A wide vortex chamber thereabove is connected thereto via inclined surfaces.

In accordance with the preferred embodiment there then follows a short ejection section. The rotor here has thrower blades, which are surrounded by casing parts in such a manner that the fibers are ejected in the radial direction.

An advantageous development of a fine breaking and fiber cleaning device of this kind could comprise dividing the rotor, particularly between the fine breaking section and the loosening section, these rotor parts rotating at different speeds with the aid of a hollow shaft construction. The vortex chamber expediently has the higher speed of rotation. The device need not consist of only four sections, as mentioned. For example, a plurality of fine breaking and loosening sections may alternately follow one another. Instead of an elongated single-axis device, two serially operating devices may also be disposed parallel side by side, in which case the directions of flow are then opposite to one another and a reversing device must be provided at the end. As a development of the loosening section a brake comb could be inserted laterally or from the bottom into the bottom sieve, the thrower prongs passing through its prongs.

In order to remove the shives, dust and fiber residues properly, and in particular to scatter them over the field or in special cases to collect them fractionally, discharge devices are preferably disposed under the breakers and the fine breaking and fiber cleaning device.

In order to be able to feed the ejected fibers to a collecting device, a transfer device suitable for the purpose is proposed. A bale press, particularly a plunger press having a straight baling channel, is preferentially suitable as such a collecting device. Bale presses of this kind are known for straw and hay. They have a high pressing power, as is required to a particular extent for the cleaned fiber material in order to achieve a noteworthy reduction of the transport volume.

With a view to producing a machine which can be extended and adapted to changing site conditions, it is proposed that at least the central machine units, namely the breakers and the fine breaking and fiber cleaning device, should each be installed in their own frame structures and thus be formed into modules which are installed in the machine in an easily exchangeable manner. These units are thus more easily accessible or replaceable in the event of breakdown. A particularly advantageous solution consists in providing a tunnel-like carrier frame accessible at both ends, into which the modules can be inserted and in which they can be fastened in a row. It is even appropriate to guide the modules by means of rollers running on rails, and in particular to suspend them on overhead running rails projecting at both ends, so that a unit can be pulled out for inspection.

With this arrangement as starting point, an expedient construction consists in arranging the baling channel of a bale press in the longitudinal direction above the carrier frame. The transfer device may in this case comprise a belt conveyor which is disposed above the fine breaking and fiber cleaning device and receives the fibers ejected in the upward direction. The fiber wad is then arrested on a discharge comb at the other end of the belt conveyor and can be taken over by the gatherer of the bale press and carried from below into the baling channel.

Finally, the special features of a traveling flax dressing machine will also be discussed, a self-propelled machine being in particular intended. This machine may have a customary windrow pick-up device. In this case it is assumed that the flaxseed has previously been harvested by means of a normal combine harvester. However, in view of the low market value of this oilseed and because low-seed types may be available in the future, it may also be expedient to swirl the mown or pulled flax on the field by means of a machine particularly suitable for the purpose and thereby to remove the seeds and any capsules.

It is however also possible to extend the machine to form a pick-up loader and to equip it with a flax threshing unit, which could be arranged in the front region, but in any case upstream of the insertion and retention device, for example on the conveyor channel. A sieve cleaning device and a seed tank having filling and emptying means would then also have to be associated with a threshing unit. A pick-up loader of this kind can have a pick-up device and with its aid pick up the previously mown or pulled flax which has been laid in windrows. The pick-up loader may however also be run into the pretreated standing crop and would then also have to be equipped with a pulling device or a mowing unit. The threshed flax straw would in any case then be immediately further processed.

In view of the weight of so large a machine, it must be equipped with suitable running gear. Apart from wheeled running gear having single or tandem axles, such gear may above all be of the tracklaying type or have so-called half-tracks, particularly rubber crawler bands, and steerable wheels. The driver's cab could be arranged on the forwardly projecting running rails of the carrier frame.

BRIEF DESCRIPTION OF THE DRAWINGS

One exemplary embodiment of the invention is explained below with reference to the drawings, in which:

FIGS. 4a and 4b shows axial sections, on the line IV—IV in FIG. 3, of two different types of star wheel prongs of the first breaker, FIG. 5 is a side view of the beater drum, shown in FIG. 3 of the second breaker, FIG. 9 is a three-dimensional sketch of one of the structure bars of the rotor shown in FIG. 8 in the fine breaking section, FIG. 10 is a partial cross section of a sieve segment with a rubbing bar and of the rotor equipped with a different structure bar in the same section, and FIG. 11 is a schematic sketch of the sieve lining of variable diameter of this section of the fine breaking device.

DETAILED DESCRIPTION OF THE INVENTION

Figure 1:
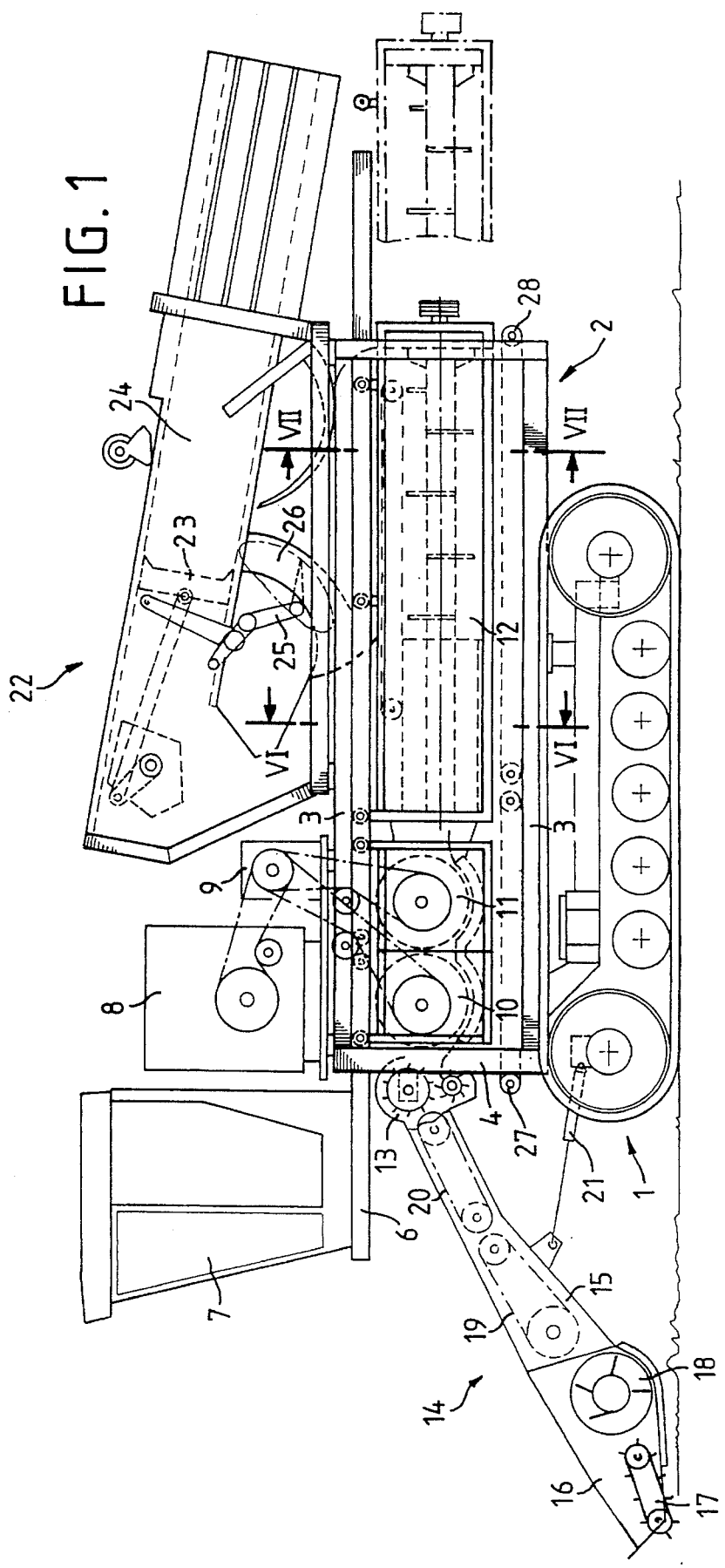
FIG. 1 is a side view of the entire flax dressing machine.

FIG. 1 shows a general view of the self-propelled flax dressing machine. On a running gear, here shown as a tracklaying undercarriage 1, is mounted an elongated rectangular carrier frame 2 consisting of four longitudinal members 3, four vertical posts 4 and four transverse members 5 (see also FIG. 6). Two horizontal running rails 6 extend directly under the top longitudinal members 3 and project a considerable distance at front and rear beyond the carrier frame. The driver's cab 7 is mounted on the front projecting portion. Behind it is situated a widened platform carrying the engine 8 and the pumps and other hydraulic units 9 for the various individual drives.

Three units in the form of exchangeable modules are inserted into the carrier frame 2, namely a star rotor breaker 10, a drum breaker 11 and a fine breaking and fiber cleaning device 12. These modules can be inserted from the front or from the rear. At the rear the fine breaking and fiber cleaning device 12 is shown in dot-dash lines in its partly withdrawn position.

At the front end of the star rotor breaker 10 an insertion and retention device 13 is attached and a pick-up attachment 14 is swivelably mounted on the latter. It comprises a conveyor channel 15 and a pick-up head 16 for flax lying tangled on the field. In detail, a chain conveyor 17 and a transverse conveyor worm 18 are installed for this purpose in the pick-up trough. The conveyor channel 15 contains two chain conveyors 19 and 20, the upper conveyor 20 rotating at a higher speed than the lower one, so that the mat of material conveyed is stretched. The bottom of the conveyor channel 15 is structured with protuberances and depressions and has openings, so that earth residues and even first wood particles can fall out. The inclination of the pick-up attachment 14 can be varied by means of an adjusting cylinder 21.

A bale press 22 known per se, which works with a powerful crank-driven plunger 23, is mounted at the top on the carrier frame 2. The baling channel 24, which has a rectangular cross section, is slightly inclined from the rear. The cleaned fibers are introduced from below into the baling channel 24 by way of a loading channel 26 with the aid of a gatherer 25.

Figure 2:
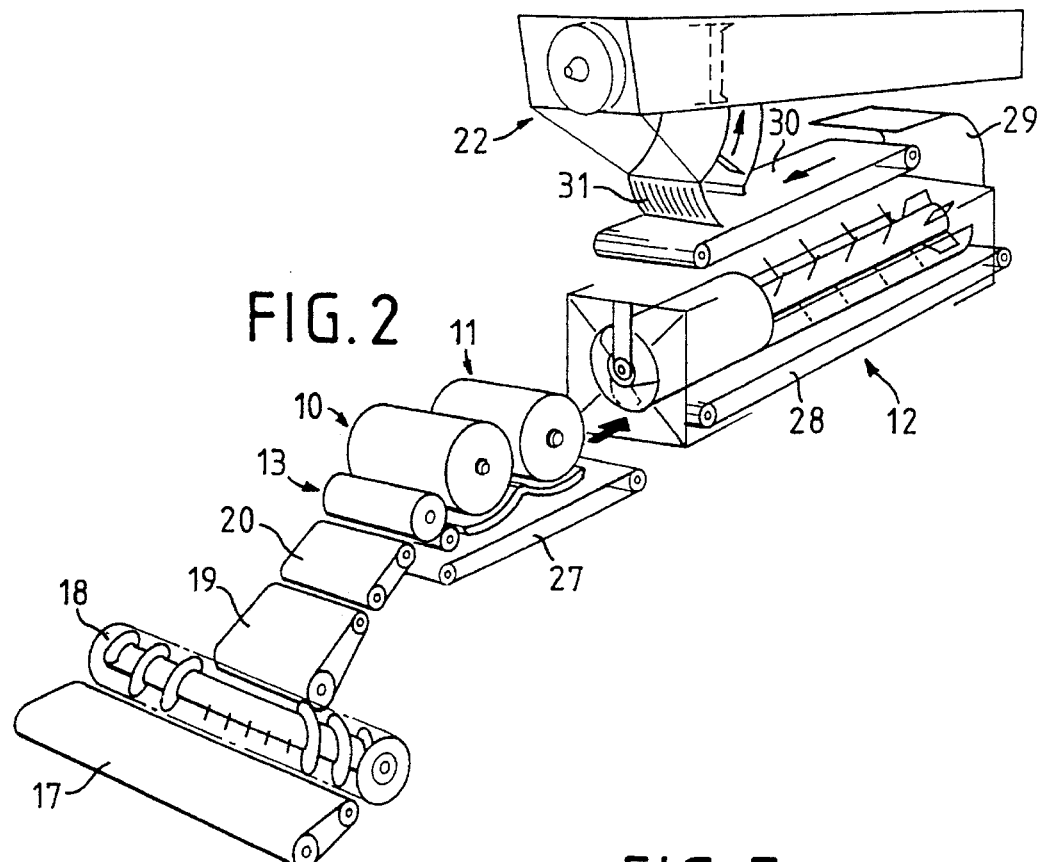
FIG. 2 is a schematic three-dimensional representation of the units essential to the dressing process.

FIG. 2 illustrates the flow of material through the various units. The tangled flax straw picked up by the various chain conveyors 17 is guided towards the center by the transverse conveyor worm 18 and then travels between the chain conveyors 19 and 20 and the bottom of the conveyor channel, which is not shown here, to the insertion and retention device 13. After this precleaning and stretching process there follows the first stage of the decortication in the breaking device, which consists essentially of the two breakers 10 and 11 and which works with a tangential flow. The already partly decorticated fibers then pass into the fine breaking and fiber cleaning device 12, which works with an axial flow and which in the example has an elongated rotor. The latter is divided into two sections, of which the rear section has a smaller diameter and a higher speed of rotation. Below the breakers 10 and 11 and the fine breaking and fiber cleaning device 12 are situated two belt conveyors 27 and 28, which discharge the separated shives, dust and fiber residues. At the rear the cleaned fibers are ejected upwards and diverted forwards by means of an arched deflector shield 29. They then fall onto a transfer belt conveyor 30 and accumulate further forward against a discharge comb 31 acting from above on the surface of the conveyor belt. From that point on the gatherer of the bale press picks up the fibers. The bales ejected at the rear, which contain the harvest yield from a relatively large area, are laid down on the field and then transported away independently.

Figure 3:
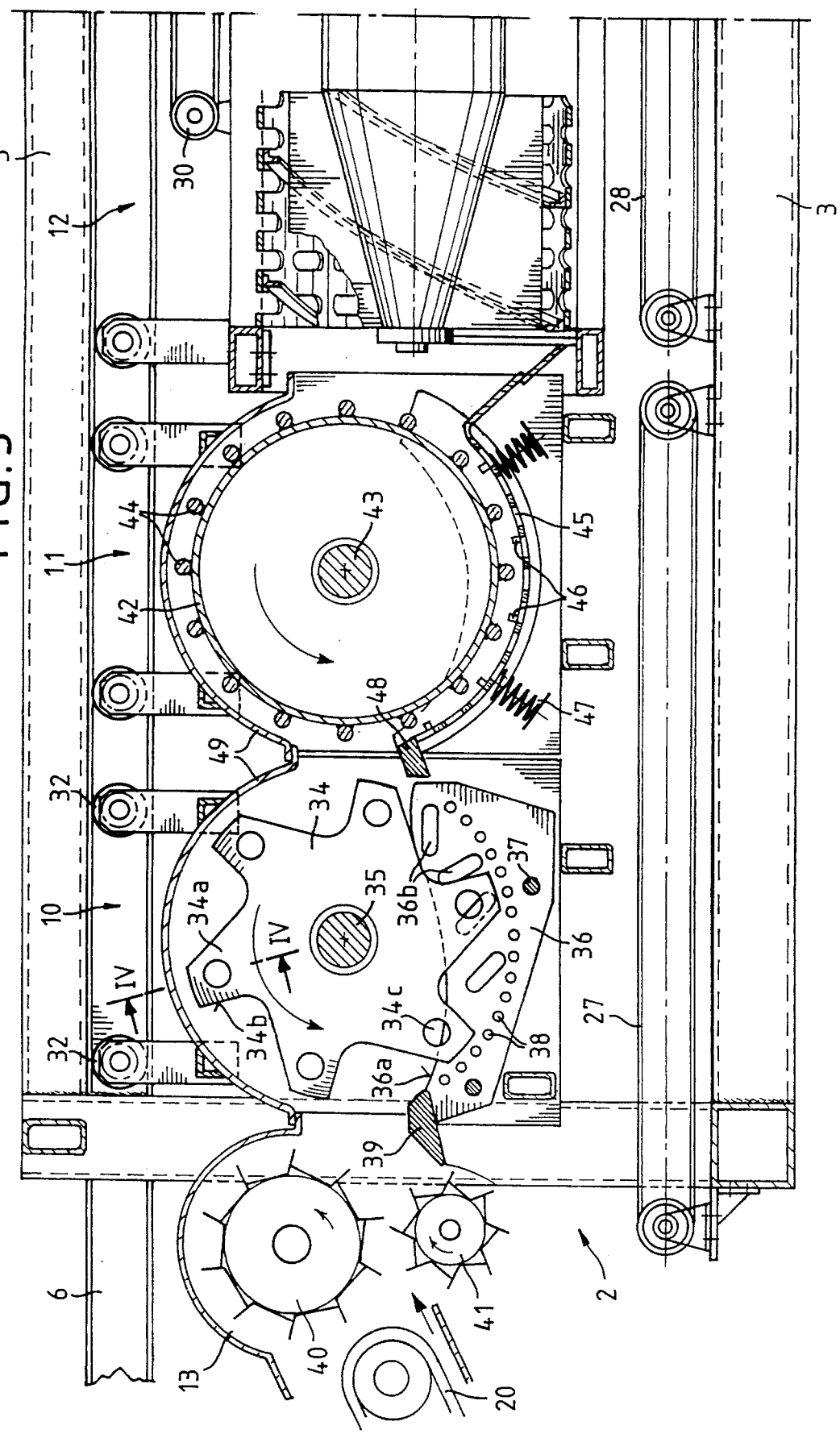
FIG. 3 is a vertical section, taken in a longitudinal plane, of the middle region of the machine shown in FIG. 1, on a larger scale.

With the aid of FIG. 3 the construction and mode of operation of the breaking device will be explained more fully. The star rotor breaker 10 in module form is installed in a sturdy, correspondingly shaped frame of rectangular tubing and is suspended on four running rollers 32 guided in the running rails 6. It is thus extremely simple to gain access to this central unit for inspection purposes. After removal of the pick-up attachment 14 this module can simply be pulled out forwards under the driver's cab. Secure fastening in the carrier frame 2 during operation is ensured with the aid of special locking means 33 indicated in FIGS. 6 and 7.

The essential cooperating parts of the first breaker 10 are a star wheel rotor and a plate comb. The rotor comprises a number of star wheels 34 of a thickness of about 10 millimeters, of which there are for example 14, and which are fastened on a rotor shaft 35 at intervals of a few centimeters. The star wheels have trapezoid-like prongs 34a whose edge 34b leading in the direction of the arrow is recedingly inclined at an angle of approximately 15° relative to the radial direction. The plate comb consists of plates 36, the number of which is adapted to the number of star wheels, being for example 15, and which have approximately the same thickness and the same spacing. They are held together with the aid of spacer sleeves and of through clamp bolts 37. Rods 38 forming an annular cage extend, parallel to the axis of the rotor and at right angles to the plates 36, through the entire plate comb, these cage rods having a surface structure like that of concrete reinforcement bars and closing at the bottom, after the style of a sieve bottom, the spaces formed between the plates. The shape of the top edge 36a of the plates, which here has a flat indentation, is also of importance to the mode of operation. The shape of the edges 34b of the star wheels should be adapted to the edge 36a.

The side surfaces both of the prongs 34a and of the plates 36 must be structured in order to form edges and obstacles against which the flax stalks can rub. According to FIG. 3 the prongs have for this purpose simple round holes 34c and the plates have elongated holes 36b. Instead, however, as shown in FIG. 4a these holes could be only partially punched through, so that on one side a depression 34d and on the other side a wart-like protuberance are formed. Another alternative according to FIG. 4b consists in that these plate-shaped parts are equipped with special tearing elements, for example inserted or attached pieces 34e of similar thickness, which have a finely and sharply grooved or toothed surface and are made of a different material. The distribution of these structurings over the surface should be random (stochastic). Of equal importance is a random and therefore irregular angular adjustment of the star wheels 34 in relation to one another on the rotor shaft. Running is thus made quieter and the mode of operation is improved.

The inlet threshold of this unit forms an exchangeable breaking bar 39 which is provided with a plurality of sharp edges and which extends parallel to the axis of the rotor over the entire plate comb. It cooperates on the one hand with the star wheel rotor and on the other hand with the insertion and retention device 13. The latter consists of two rollers 40 and 41 rotating in opposite directions and at different speeds. They are equipped with drivers and take over the stalk material from the top chain conveyor 20 of the stretching device. Since the material is held fast, and held back at the given speed, by the drivers of the rollers 40 and 41, but on the other hand comes into the range of action of the star wheels 34 rotating at high speed, it is pulled powerfully over the breaking bar 39 and thereby bent over and scraped.

The material ejected obliquely upwards from the breaker 10 then passes into the drum breaker 11, which likewise works tangentially. Its drum gap is however directed at right angles to the gaps of the plate comb and therefore acts differently on the material being processed or at a different point on the individual stalk. The decortication action is thereby greatly improved.

The so-called beater drum 42, whose shaft is designated 43, has a closed peripheral wall and is equipped with structured beating bars 44, which in the example are pieces of reinforcement bars such as are used in reinforced concrete construction. FIG. 5 shows the beater drum 42 viewed from the side. The beating bars 44 are welded in place with axially parallel orientation, but in a slightly zigzagged arrangement.

The beater drum 42 cooperates with an arched sieve bottom 45 which is disposed at the bottom and carries axially parallel rubbing bars 46 projecting on the inside or is formed with correspondingly projecting edges. This sieve bottom 45 is mounted resiliently and adjustably with the aid of spring elements 47, so that it can yield in a downward direction. It also carries an exchangeable breaking bar 48 at the inlet of the drum breaker 11 or at the point of transition between the two breakers. Its mode of operation is the same as that of the breaking bar 39.

The drum breaker 11 is also in the form of a module and suspended on running rollers, with the aid of which it can be pushed towards the first breaker. Both the breakers and also the top roller 40 of the insertion and retention device are closed off at the top by respective arched casings (for example 49). The horizontal belt conveyor 27 extends under the breaking device for the purpose of carrying away the wood and fiber parts which have been separated by the sieves.

From the breaking device the fibers already extensively decorticated pass into the axially operating fine breaking and fiber cleaning device 12. The latter is described below with the aid of FIGS. 6 and 7 and in particular of FIG. 8. From left to right, four sections can be distinguished therein, namely an intake section A, a fine breaking section B, a loosening section C and an ejection section D. The elongated rotor is mounted in a pedestal bearing 51 at the inlet end. The drive is situated on the right-hand side in the ejection section D. Between B and C the rotor is divided. The shaft 52 of the left-hand rotor section extends through the right-hand rotor section so that the right-hand section can be driven at a higher rotational speed. As already mentioned, the belt conveyor 28 extends under the device for the purpose of discharging the wood and fiber components.

In the intake section A the rotor is conical, with an increasing diameter. It carries four blades 53 which are arranged crosswise in axial planes and have an axially parallel outer edge and of which one is shown broken off. This rotor section is surrounded by a stationary, closed sieve ring 54, which on the inside is equipped with spiral swirling or guide bars 55. In conjunction with the blades 53 the bars 55 have the effect of pulling in the fibers.

The cylindrical peripheral wall of the rotor in section B has a large diameter and is equipped with spirally arranged structured bars 56. It is surrounded by a sieve lining which is divided in the peripheral direction and whose segments are designated 57. On the inside these segments carry rubbing bars 58 which are in the form of partial spirals and whose pitch does not coincide with the pitch of the structured bars 56. The special feature of this fine breaking section B consists in that the already relatively fine fiber wad is pressed, thoroughly fulled and rubbed between the structured bars and rubbing bars. Although the fibers are most effectively protected against damage, further wood components are thereby detached.

The shape of the structured bars 56 can be seen in particular in FIG. 9. They have an inverted V-shaped cross section and on the crest and at the sides have openings 59 and 60. Sharp edges are thereby formed. The elongated openings in the sides may be disposed at right angles or obliquely to the lengthwise direction of the structured bar. FIG. 10 shows in cross section a different embodiment of the structured bar 56', according to which only impressions are formed instead of openings. This figure also shows the shape of the rubbing bars 58 attached to the sieve lining segments 57. The latter and also the sieve ring 54 of section A have holes of a diameter of 3 centimeters.

The sketch in FIG. 11 shows schematically that the three sieve lining segments 57 illustrated are radially adjustable. They are disposed in appropriate slide guides and suitably moved, for example directly by means of hydraulic adjusting cylinders. If a great deal of fiber is present in the peripheral space between the sieve lining segments and the peripheral wall of the drum in section B, it exerts a considerable braking moment on the rotor, and this may even lead to impermissible heating of the fibers. Steps are therefore taken to measure the braking moment of this drum section and accordingly to eliminate the clogging by controlling action on the sieve lining segments 57 by accordingly pulling the latter outwards. Through this regulating action the mode of operation can be optimized irrespective of the yield of material.

In the following loosening section C the rotor, which rotates at a higher speed, has a smaller diameter. It carries radial thrower prongs 61 in the form of rods which have a circular cross section and which are disposed spirally on the rotor. At the bottom the rotor is closed by a cylindrical bottom sieve 62 which consists of diagonal wire fabric and which on the inside is equipped with swirling bars 63 in the form of partial spirals. Inclined sieves 64 adjoin the bottom sieve on both sides and form a wide, tall vortex chamber which at the top is closed by a roof 65. Through the loosening and swirling of the fibers in this section C the wood components already detached from the fibers are effectively separated, while the fiber material moves on slowly in the axial direction. In order to be able to control the swirling process, it is conceivable to insert a brake comb 66 radially into the bottom sieve 62. The position of this brake comb can also be controlled by a regulating device.

Figure 7:
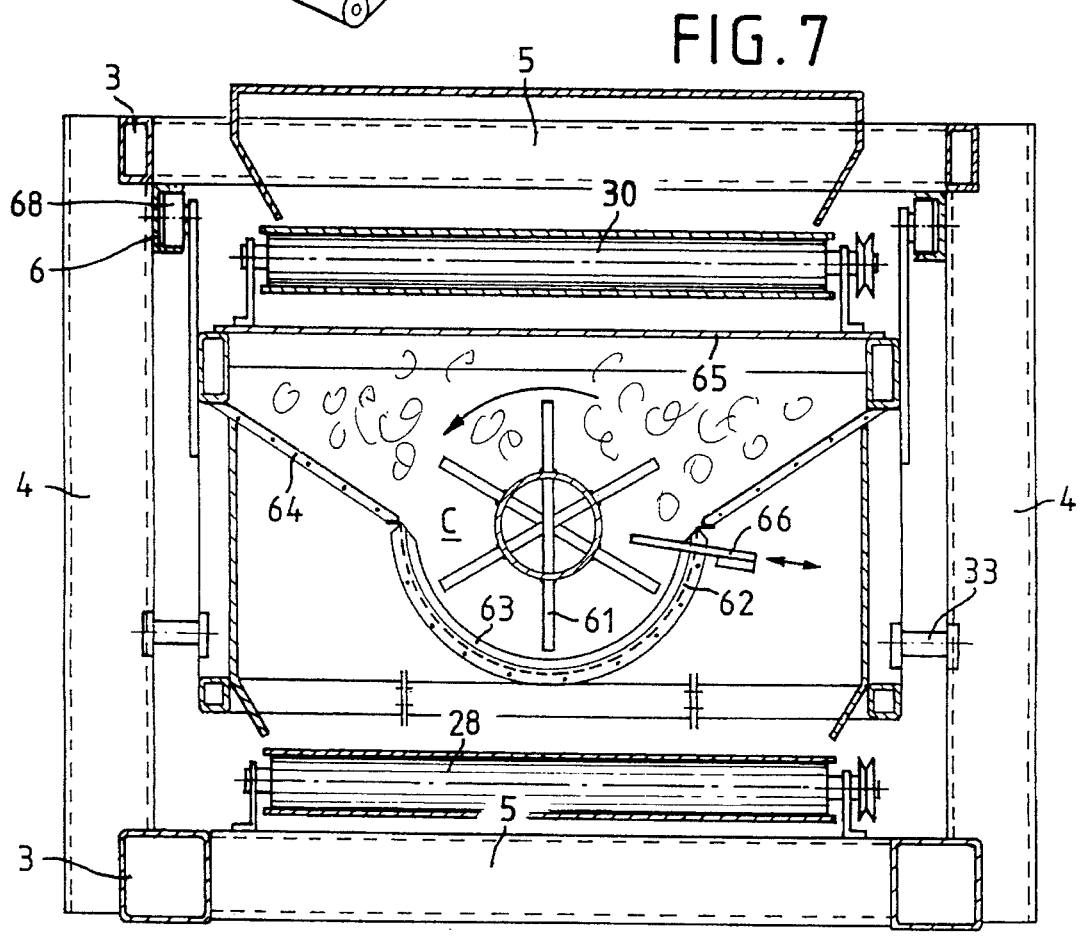
FIG. 7 is a cross section, on the line VII—VII, of the machine shown in FIG. 1.
Figure 6:
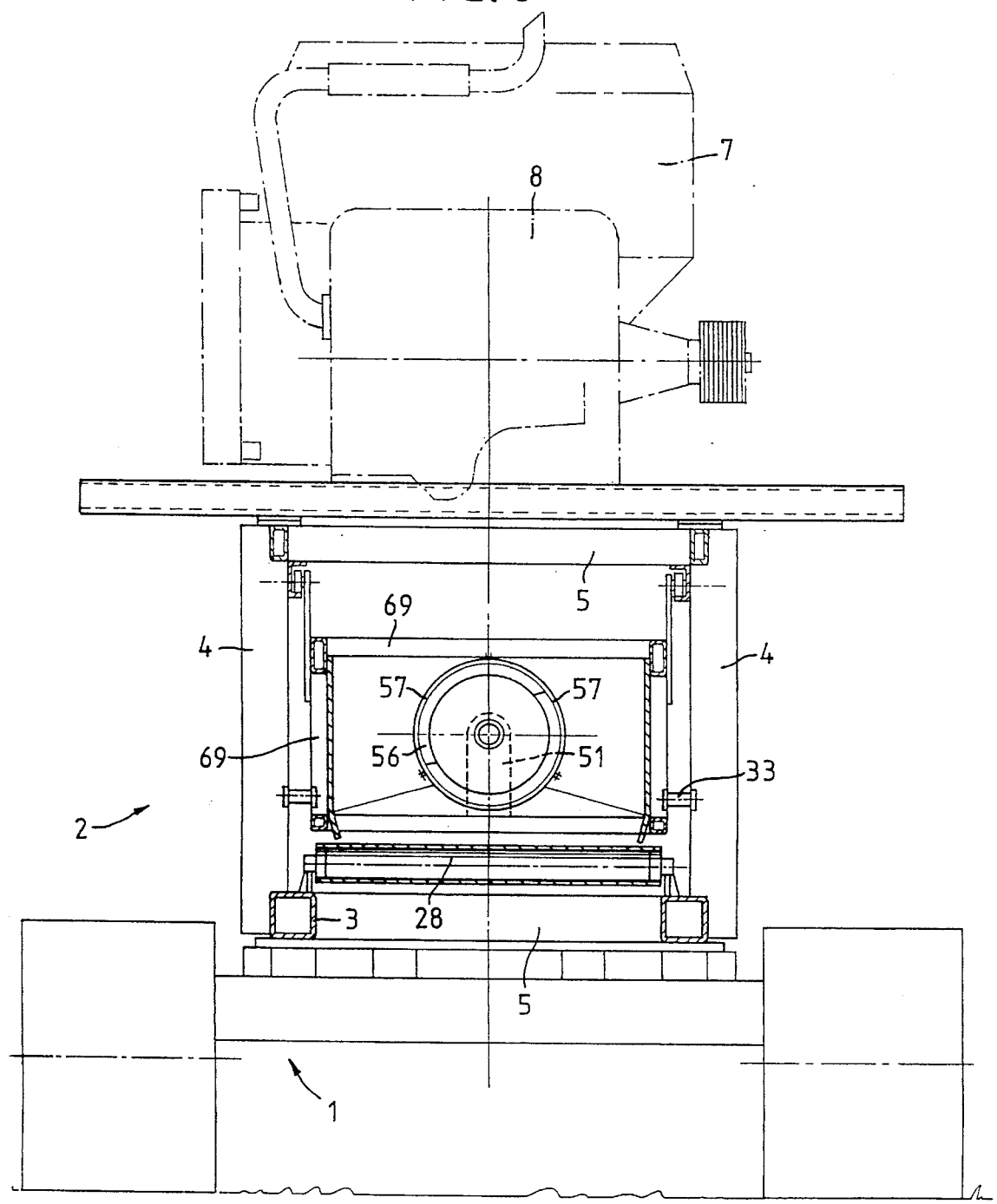
FIG. 6 is a cross section, on the line VI—VI, of the machine shown in FIG. 1, on a larger scale.

FIGS. 6 and 7 convincingly show the modular construction of this fine breaking and fiber cleaning device 12 also. The individual frame elements suspended on running rollers 68 are designated 69.

Figure 8:
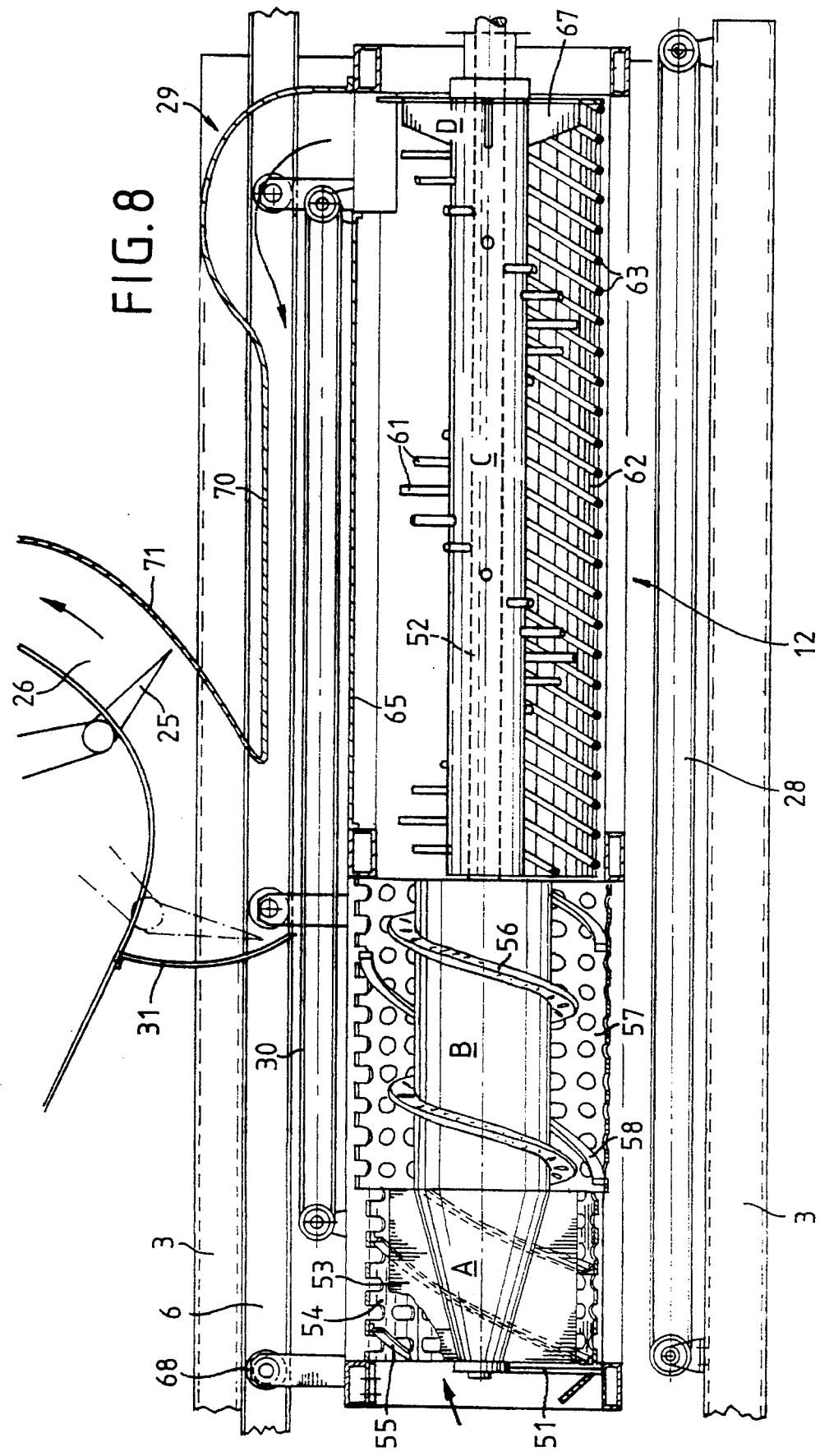
FIG. 8 is an axial section on a larger scale of the fine breaking and fiber cleaning device.

Finally, the ejection section D is short. Here thrower blades 67 are provided on the rotor and eject the fibers upwards because of the appropriate shape of the casing. They are then forced forwards by the deflector shield 29 and fall onto the transfer belt conveyor 30. As shown in FIGS. 7 and 8, a conveying channel is formed by side walls and a roof 70 above the belt. The roof 70 merges into the bottom 71 of the loading channel 26 of the baling press. An accumulation chamber begins here and is closed at the front by a discharge comb 31 reaching down onto the surface of the conveyor belt. The fiber wad accumulating here is picked up by the gatherer 25 of the bale press and conveyed upwards through the loading channel 26 into the baling channel.

It is obvious that the fiber dressing machine described can also be operated in a stationary position without the pick-up head 16, in which case it is preferably conceivable to mount it on wheels and to move it as a trailer to another suitable site from time to time. In this case the flax in tangled form is picked up from the field by means of a loading truck or the like and transported to the machine stationed nearby.

We claim:

1. A method of decorticating a tangled mass of flax, comprising the steps of:

feeding the tangled mass of flax into a flax dressing machine;

pulling the flax over a first breaking edge;

moving the flax, after said pulling step, through a plurality of parallel slots using a plurality of gripping elements;

pulling the flax, after said moving step, over a second breaking edge;

conveying the flax from the second breaking edge through a peripheral gap formed in a drum breaking device in a direction tangential to the device to form an essentially decorticated fiber; and moving the fiber, after said conveying step, in an axial direction through a fine breaking and fiber cleaning device having an elongated rotor and being comprised of means for conveying, loosening, separating, and cleaning the flax.

2. A method as defined in claim 1, further comprising the step of self-propelling the flax dressing machine through a field; and scattering produced wood components over the field.

3. A method as defined in claim 2, further comprising the step of one of pulling and mowing the flax; and subsequently drying the flax prior to said feeding step.

4. A method as defined in claim 2, further comprising the step of picking up the tangled mass in the field prior to said feeding step.

5. A method as defined in claim 2, further comprising the step of pressing the fiber into bales after said moving step.

6. A flax dressing machine for decorticating a tangled mass of flax, comprising:

a first breaking edge located adjacent to an entrance into an interior of said flax dressing machine;

a first breaker comprising a plurality of stationary plate-shaped elements arranged to form a plurality of parallel gaps, and a plurality of rotatable plate-shaped elements forming a plurality of parallel and radially arranged gaps and being rotatable about a first axis arranged transverse to a direction of flow of the flax, each of the gaps formed by said stationary and said rotatable plate-shaped elements extending essentially in a direction of flow of the flax;

a second breaker comprising a drum rotatable about a second axis parallel to the first axis and arranged transverse to the direction of flow of the flax, said drum having a plurality of beating tools attached to an outer circumference thereof, and a peripherally arranged bottom region forming with the outer circumference a peripheral gapped region for accommodating the flax, said bottom region having a plurality of stationary rubbing tools attached thereto and cooperating with the beating tools attached to said drum, wherein one of said first and second breakers is located adjacent to said first breaking edge;

a second breaking edge located between and adjacent to said first breaker and said second breaker; and a fine-breaking and fiber-cleaning device having an elongated rotor rotatable about at least one third axis essentially transverse to the first and second axis and extending in the direction of flow of the flax, and being comprised of means for conveying, loosening, separating, and cleaning the flax, said fine-breaking and fiber-cleaning device being located subsequent to said first and second breakers relative to the direction of flow of the flax.

7. A flax dressing machine as defined in claim 6, wherein said flax dressing machine is self-propelled.

8. A flax dressing machine as defined in claim 6, wherein each said rotatable plate-shaped element on said first breaker comprises a star wheel having a plurality of prongs, said star wheels being axially arranged at determined intervals to collectively form a rotor, said stationary plate-shaped elements collectively forming a comb having the parallel gaps formed therein, said prongs engaging the parallel gaps formed in said comb.

9. A flax dressing machine as defined in claim 8, wherein said comb is arranged under said rotor, and includes a plurality of cage rods each passing through each of the stationary plate-shaped elements to form a sieve bottom.

10. A flax dressing machine as defined in claim 9, wherein said cage rods each have a structured surface.

11. A flax dressing machine as defined in claim 8, wherein each stationary plate-shaped element includes a curved top edge forming an indentation as viewed along the first axis, and each said prong includes a leading edge having a radially arranged receding shape relative to a direction of rotation.

12. A flax dressing machine as defined in claim 11, wherein the indentation is located at an inlet region of said prongs.

13. A flax dressing machine as defined in claim 8, wherein said star wheels and stationary plate-shaped elements each have at least one of an edged hole, an indentation and bulge, and a structured surface region.

14. A flax dressing machine as defined in claim 13, wherein said star wheels are randomly angularly adjusted relative to each other, and said at least one of the edged hole, the indentation and bulge, and the structured surface region are randomly distributed over a respective surface.

15. A flax dressing machine as defined in claim 8, wherein said star wheels are randomly angularly adjusted relative to each other.

16. A flax dressing machine as defined in claim 13, wherein said at least one of the edged hole, the indentation and bulge, and the structured surface region are randomly distributed over a respective surface.

17. A flax dressing machine as defined in claim 6, wherein the outer circumference of said drum forms a closed cylindrical peripheral wall, said beating tools being attached to said peripheral wall in an axially parallel orientation, said stationary rubbing tools forming an arched sieve bottom in the bottom region and being axially and parallelly arranged.

18. A flax dressing machine as defined in claim 17, wherein at least one of said beating tools and said stationary rubbing tools has a structured surface.

19. A flax dressing machine as defined in claim 17, wherein said sieve bottom is resiliently and adjustably mounted in a radial direction relative to said drum.

20. A flax dressing machine as defined in claim 9, further comprising a barrel-shaped casing covering said first and second breakers and forming a respective inlet and outlet with said sieve bottom and said bottom region.

21. A flax dressing machine as defined in claim 6, wherein said first and second breaking edges are formed on respective exchangeable multi-edged breaking bars.

22. A flax dressing machine as defined in claim 6, wherein said one of said breakers is arranged directly behind the other one of said breakers; further comprising an insertion and retention device located at an inlet into the other one of said breakers.

23. A flax dressing machine as defined in claim 22, wherein said insertion and retention device comprises at least two rollers each being rotatably driven at different peripheral speeds and in opposite directions.

24. A flax dressing machine as defined in claim 22, further comprising a conveyor device including means for stretching the tangled mass of flax and being connected to said insertion and retention device at a location upstream thereto.

25. A flax dressing machine as defined in claim 22, wherein said conveyor device includes a conveyor channel having at least two chain conveyors arranged in series therein, said at least two chain conveyors each being drivable at a different speed, said speeds increasing in a direction of conveyance.

26. A flax dressing machine as defined in claim 25, wherein said conveyor channel has a structured bottom having a plurality of openings therein.

27. A flax dressing machine as defined in claim 6, wherein said fine-breaking and fiber-cleaning device is divided in the direction of flow of the flax into at least four different sections each having a different length, and includes an intake section having a rotor section having a progressively increasing diameter, a fine breaking section comprising a first cylindrical rotor section having a first diameter, a loosening section comprising a second cylindrical rotor section having a second diameter smaller than the first diameter, and an ejection section, respectively.

28. A flax dressing machine as defined in claim 27, wherein the rotor section of said intake section includes a plurality of blades each arranged in an axial plane and each having an axially parallel outer edge, said intake section further including a cylindrical sieve ring surrounding the outer edges, and having a spirally arranged guide bar located on an inner surface thereof.

29. A flax dressing machine as defined in claim 27, wherein the first cylindrical rotor section of said fine breaking section includes a structured bar arranged in a spiral pattern around a circumference of said first cylindrical rotor section, said fine breaking section further including a sieve lining surrounding said structured bars and being divided into a plurality of peripheral segments expandable in a radial direction and including an inner surface having partially spiral rubbing bars located thereon.

30. A flax dressing machine as defined in claim 29, wherein said sieve lining is composed of perforated sheet metal.

31. A flax dressing machine as defined in claim 28, wherein said sieve ring is composed of perforated sheet metal.

32. A flax dressing machine as defined in claim 29, wherein said structured bars have an A-shaped cross section forming two flanks and a crest, and are composed of sheet metal, each structured bar including one of randomly distributed openings, impressions and embossing, and grooving on the flanks and crest.

33. A flax dressing machine as defined in claim 29, further comprising means for measuring a breaking moment on a respective peripheral segment and for controlling a pressing force on the respective peripheral segment in dependence on the breaking moment.

34. A flax dressing machine as defined in claim 27, wherein said second cylindrical rotor section of said loosening section includes a plurality of radially and spirally arranged thrower prongs, said loosening section further comprising a coaxial cylindrical bottom sieve composed of diagonal wire fabric having an inner side with partially spiraled-shaped swirling bars located thereon, and an outwardly tapered vortex chamber located above said second cylindrical rotor section.

35. A flax dressing machine as defined in claim 27, wherein said ejection section includes a rotor section having thrower blades thereon for ejecting a fiber in a radial direction out of said fine-breaking and fiber-cleaning device, and a casing surrounding the thrower blades.

36. A flax dressing machine as defined in claim 27, wherein the first cylindrical rotor section is divided from the second cylindrical rotor section at a junction of said fine breaking section and said loosening section, the first cylindrical rotor section being rotatable at a first speed, and the second cylindrical rotor section being rotatable at a second speed different from the first speed.

37. A flax dressing machine as defined in claim 6, wherein the at least one third axis comprises a plurality of third axes, said fine-breaking and fiber-cleaning device being divided into a plurality of partial devices each located parallel to one another along a respective third axis, and operating serially.

38. A flax dressing machine as defined in claim 34, wherein said loosening section includes a brake comb having a plurality of comb prongs and inserted radially into said coaxial cylindrical bottom sieve, said thrower prongs passing by said comb prongs when said second cylindrical rotor section is rotated.

39. A flax dressing machine as defined in claim 6, further comprising at least one discharge device located underneath said first breaker, said second breaker and said fine-breaking and fiber-cleaning device, said at least one discharge device discharging shives, dust and fibers.

40. A flax dressing machine as defined in claim 6, further comprising a collecting device, and a transfer device adjoining said fine-breaking and fiber-cleaning device for feeding fibers ejected therefrom to said collecting device.

41. A flax dressing machine as defined in claim 40, wherein said collecting device comprises a bale press.

42. A flax dressing machine as defined in claim 41, wherein said bale press comprises a plunger press having a straight baling channel.

43. A flax dressing machine as defined in claim 6, wherein said first breaker, said second breaker and said fine-breaking and fiber-cleaning device each includes a discrete frame to form a plurality of modules each being fastened in the interior of said flax dressing machine in an easily exchangeable manner.

44. A flax dressing machine as defined in claim 43, further comprising a carrier frame having a tunnel shape having two open ends, said modules being insertable into said carrier frame from either respective end and fastened therein in a serial arrangement.

45. A flax dressing machine as defined in claim 44, further comprising a bale press having a baling channel arranged in a longitudinal direction above said carrier frame and a loading channel leading into a bottom of the baling channel; a transfer device adjoining said fine-breaking and fiber-cleaning device comprising a belt conveyor located above said fine-breaking and fiber-cleaning device for feeding fibers ejected therefrom to said bale press; a gatherer located at an inlet of the loading channel; and a discharge comb located in a region of said gatherer and over said belt conveyor for accumulating the fibers transported thereon.

46. A flax dressing machine as defined in claim 44, wherein said carrier frame includes at least one overhead running rail projecting from each respective end for suspending said modules therefrom.

47. A traveling flax dressing machine for decorticating a tangled mass of flax, comprising:

a windrow pick-up head for picking up the tangled mass of flax, said pick-up head having one of a pulling device and a mowing unit connected thereto;

a first breaking edge located adjacent to an entrance into an interior of said flax dressing machine;

a first breaker comprising a plurality of stationary plate-shaped elements arranged to form a plurality of parallel gaps, and a plurality of rotatable plate-shaped elements forming a plurality of parallel and radially arranged gaps and being rotatable about a first axis arranged transverse to a direction of flow of the flax, each of the gaps formed by said stationary and said rotatable plate-shaped elements extending essentially in the direction of flow of the flax;

a second breaker comprising a drum rotatable about a second axis parallel to the first axis and arranged transverse to the direction of flow of the flax, said drum having a plurality of beating tools attached to an outer circumference thereof, and a peripherally arranged bottom region forming with the outer circumference a peripheral gapped region for accommodating the flax, said bottom region having a plurality of stationary rubbing tools attached thereto and cooperating with the beating tools attached to said drum, wherein one of said first and second breakers is located adjacent to said first breaking edge;

a second breaking edge located between and adjacent to said first breaker and said second breaker; and a fine-breaking and fiber-cleaning device having an elongated rotor rotatable about at least one third axis essentially transverse to the first and second axis and extending in the direction of flow of the flax, and being comprised of a plurality of different axially arranged sections for conveying, loosening, separating, and cleaning the flax, said fine-breaking and fiber-cleaning device being located subsequent to said first and second breakers relative to the direction of flow of the flax.

48. A traveling flax dressing machine as defined in claim 47, further comprising an insertion and retention device located at an inlet into the interior of said flax dressing machine; and a flax threshing unit located in a direction upstream of said insertion and retention device relative to the direction of flow of the flax.

49. A traveling flax dressing machine as defined in claim 48, further comprising a sieve cleaning device, and a seed tank having a filling and emptying device, said sieve cleaning device and said seed tank each being associated with said flax threshing unit.

50. A traveling flax dressing machine as defined in claim 47, further comprising a driven under carriage.

51. A traveling flax dressing machine as defined in claim 47, further comprising a carrier frame for containing said first breaker, said second breaker and said fine-breaking and fiber-cleaning device, and including at least one running rail projecting in a forward direction therefrom; and a driver's cab located on said at least one running rail.

* * * * *